June 19, 1951  W. S. FORCIER ET AL  2,557,733
SELF-CUTTING TAP
Filed April 6, 1948
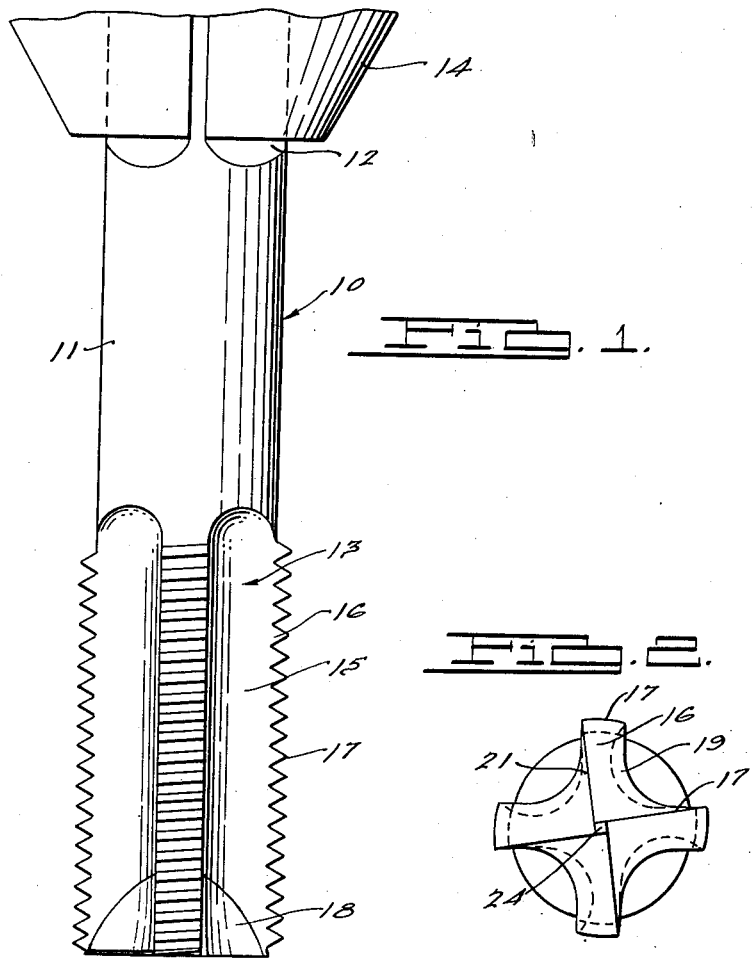
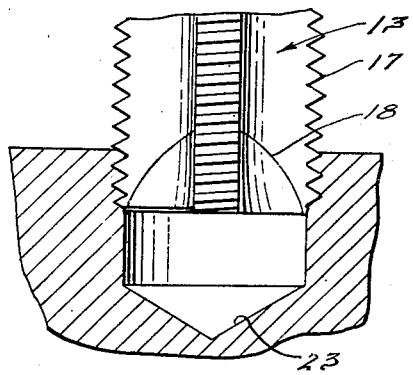
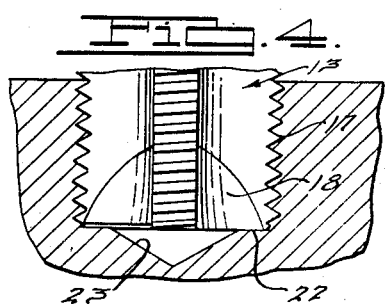
INVENTORS.
Walter S. Forcier,
Arthur C. Wood.
BY
Harness, Dickey & Pierce.
ATTORNEYS.

Patented June 19, 1951

2,557,733

UNITED STATES PATENT OFFICE 2,557,733

SELF-CUTTING TAP

Walter S. Forcier, Bay City, and Arthur C. Wood, Highland Park, Mich.

Application April 6, 1948, Serial No. 19,334

6 Claims. (Cl. 10—140)

This invention relates to taps, and particularly to a tap having cutting edges on the end face thereof.

Breakage of taps often occurs because they are advanced into a drilled hole beyond the depth of the cylindrical wall portion thereof. The blind end tapered portion at the bottom of the hole seizes the end of the tap and causes the tap to break as it is rotated. This is especially true in multiple spindle tapping machines where one or more of the holes drilled by a gang drilling machine have not been drilled to the depth of the majority of the holes or a tap end protrudes beyond the ends of the other taps. When the plurality of taps are advanced into the holes, the tap striking the bottom of a hole before the operation is completed will be broken, necessitating delay in production when replacing the tap and removing the broken tap in the workpiece.

The present invention provides on the flat bottom face of the tap cutting teeth in the form of an end mill cutter which is available for cutting the tapered end of the drilled hole as the tap advances to complete the tapping operation. The flutes on the tap taper outwardly near the end to provide strength rearwardly of the cutting edge so as to permit a substantial amount of cutting to be effected by the cutting teeth without damage to the tap itself. It was found by the use of this tap that the breakage which occurred heretofore in gang tapping has been eliminated and the cost attending the shutdown of the machines, removal of the broken taps and replacement of taps has thereby been reduced or eliminated.

Accordingly, the main objects of the invention are: to provide a tap having an end mill on the end face thereof for machining the tapered end of a drilled hole as the tap advances therein; to provide a tap having flutes which taper outwardly near the ends to provide additional material to back up the cutting edges during the cutting operation; and, in general, to provide a tap which substantially eliminates the breakage due to the jamming of the tap in the end of a drilled hole, which is simple in construction and economical of manufacture.

Other objects and features of novelty of the invention will be specifically pointed out or will become apparent when referring, for a better understanding of the invention, to the following description, taken in conjunction with the accompanying drawing, wherein:

Figure 1 is a view in elevation of a tap having cutting edges on the end face embodying features of this invention;

Fig. 2 is an end view of the tap illustrated in Fig. 1;

Fig. 3 is a view in elevation of the tap disposed part way in the hole to be threaded; and Fig. 4 is a view in elevation of the tap at the end of the operation, showing the manner in which the end cutting edges machined the hole end during the tap advancement.

Referring to the figures, a tap 10 is illustrated, having a shank portion 11, a square end 12 and a cutting end 13 of conventional form. The square end 12 is herein illustrated as being supported in a collet 14 in a machine which drives the tap in both directions of rotation so as to be advanced into and retracted from a hole to be tapped. The cutting end 13 of the tap is provided with flutes 15 forming lands 16 having teeth 17 thereon relieved from the forward edge for cutting threads in the wall of the hole to be tapped.

The flutes near the end of the tap flare outwardly at 18 to provide a greater width 19 to the land portion 16 near the end for backing up the cutting edges 21. The cutting edges 21 are aligned with each of the lands 16 at the forward edge of the teeth 17 thereof. The teeth 17 on each of the lands 16 are relieved from the forward edge in the usual manner and relief is provided to the cutting edges 21 rearwardly thereof across the end land faces 19 thereof. The cutting edges 21 on the end of the tap are not intended to function as a drill for drilling the hole but are only intended for cutting a shoulder 22 in the blind end 23 of the hole, as illustrated in Fig. 4, which is of conical form due to the sloping cutting edges on the end of the drill. By cutting the shoulder 22 at the blind end of the drilled hole, an additional thread or two may be cut into the wall of the hole without placing substantially any strain upon the drill. Heretofore, when the end of the drill engaged the blind tapered end of the hole, it became wedged in the hole and was broken.

While the cutting edges 21 are herein illustrated as being disposed tangent to a small circle 24 (not shown) on the axis of the tap, this arrangement produces satisfactory tapping as it is not intended that the cutting edges 21 should cut to or beyond the apex of the conical end 23 of the drilled hole. However, it is within the purview of the invention to have the cutting edges 21 disposed in aligned relation, crossing each other on the axis of the tap.

What is claimed is:

1. A blind hole tap having a shank portion provided with flutes forming spaced lands on which teeth of a thread are provided, and cutting edges on the end face disposed in a common plane substantially normal to the axis of the tap with each cutting edge extending along a land edge to the axis of the tap.

2. A blind hole tap having a shank portion provided with flutes forming spaced lands having on the periphery thereof teeth of a thread, and cutting edges on the ends of the lands disposed in a common plane substantially normal to the axis of the tap and extending from the base of the teeth to the axis of the tap body, said cutting edges being relieved rearwardly thereof.

3. A blind hole tap having a shank portion provided with flutes forming spaced lands having on the periphery thereof teeth of a thread, and cutting edges on the ends of the lands disposed in a common plane substantially normal to the axis of the tap and extending from the base of the teeth to the axis of the tap body, said cutting edges being relieved rearwardly thereof, said flutes tapering outwardly near the end to provide a greater thickness of material for backing up the cutting edges.

4. A blind hole tap having a shank portion provided with flutes forming spaced lands having on the periphery thereof teeth of a thread, and cutting edges on the ends of the lands at the ends extending from the base of the teeth to the axis of the tap body, said cutting edges being relieved rearwardly thereof, said flutes tapering outwardly near the end to provide a greater thickness of material for backing up the cutting edges, said end being flat to have the cutting edges disposed in a common plane.

5. A blind hole tap having a shank portion and a portion containing flutes forming spaced lands, cutting teeth on said lands which are relieved from the forward edge thereof, and cutting edges on the end of the tap disposed in a common plane substantially normal to the axis of the tap and extending from the forward edge of said teeth to the axis of the tap.

6. A blind hole tap having a shank portion and a portion containing flutes forming spaced lands, cutting teeth on said lands which are relieved from the cutting faces thereof, and cutting edges on the end of the tap disposed in a common plane substantially normal to the axis of the tap and extending from the cutting faces of said teeth to the axis of the tap, said flutes tapering outwardly near the end to provide a greater width of material rearwardly of the end cutting edges which slope therefrom to provide relief.

WALTER S. FORCIER.
ARTHUR C. WOOD.

REFERENCES CITED

The following references are of record in the file of this patent:

UNITED STATES PATENTS

| Number | Name | Date |
|---|---|---|
| 659,125 | Boentgen | Oct. 2, 1900 |
| 1,288,893 | Holmes | Dec. 24, 1918 |
| 1,638,230 | Alsaker | Aug. 9, 1927 |